United States Patent [19]

Mattson

[11] Patent Number: 4,688,375
[45] Date of Patent: Aug. 25, 1987

[54] MOWER ATTACHMENT FOR FARM TRACTORS

[76] Inventor: Fred P. Mattson, Box 248, Elmwood, Wis. 54740

[21] Appl. No.: 875,924

[22] Filed: Jun. 19, 1986

Related U.S. Application Data

[63] Continuation-in-part of Ser. No. 619,078, Jun. 11, 1984, abandoned.

[51] Int. Cl.$^4$ .................. A01D 75/30; A01D 34/44
[52] U.S. Cl. ........................................... 56/7
[58] Field of Search .................. 56/6, 7, 13.6

[56] References Cited

U.S. PATENT DOCUMENTS

| | | | |
|---|---|---|---|
| 1,437,874 | 12/1922 | Townsend | 56/7 |
| 1,561,569 | 11/1925 | Roseman | 56/7 |
| 1,957,079 | 5/1934 | Ronning | 56/7 |
| 2,465,405 | 3/1949 | Strawn | 56/7 |
| 2,653,437 | 9/1953 | Crump | 56/7 |
| 3,514,926 | 6/1970 | Heth et al. | 56/7 |
| 4,161,858 | 7/1979 | Gerrits | 56/7 |
| 4,370,846 | 2/1983 | Arnold | 56/6 |
| 4,478,026 | 10/1984 | Mullet et al. | 56/13.6 |
| 4,481,755 | 11/1984 | Carr | 56/7 |

*Primary Examiner*—Paul J. Hirsch
*Attorney, Agent, or Firm*—Orrin M. Haugen; Thomas J. Nikolai; Frederick W. Niebuhr

[57] ABSTRACT

A bracket assembly is adapted for attachment to the front end of a conventional garden or farm tractor which allows two spaced-apart leading reel-type mowers to be pulled ahead of the tractor wheels so that the grass will be cut before being compacted by the passage of the tractor wheels over it. The bracket comprises first and second elongated arms having cylindrical stub ends extending laterally inwardly at one end of the arms, the cylindrical stubs being arranged to telescopingly fit within a cylindrical pipe, which is adapted to be bolted or otherwise affixed to the front end of the tractor. One or more spacer bars extend between the two arms to maintain the arms in a common plane. Extending downwardly at the other end of each arm is a bar member having a suitable connection point at its lower end to which a reel-type mower assembly may be connected. The length of the elongated arms are such that the mower assembly will be pulled rather than pushed, but from a location which is forward of the tractor's front wheels. A trailing reel-type mower, connected to the tractor by linkage including two draw bars of enhanced transverse length, cuts grass in the gap between the leading mowers.

6 Claims, 7 Drawing Figures

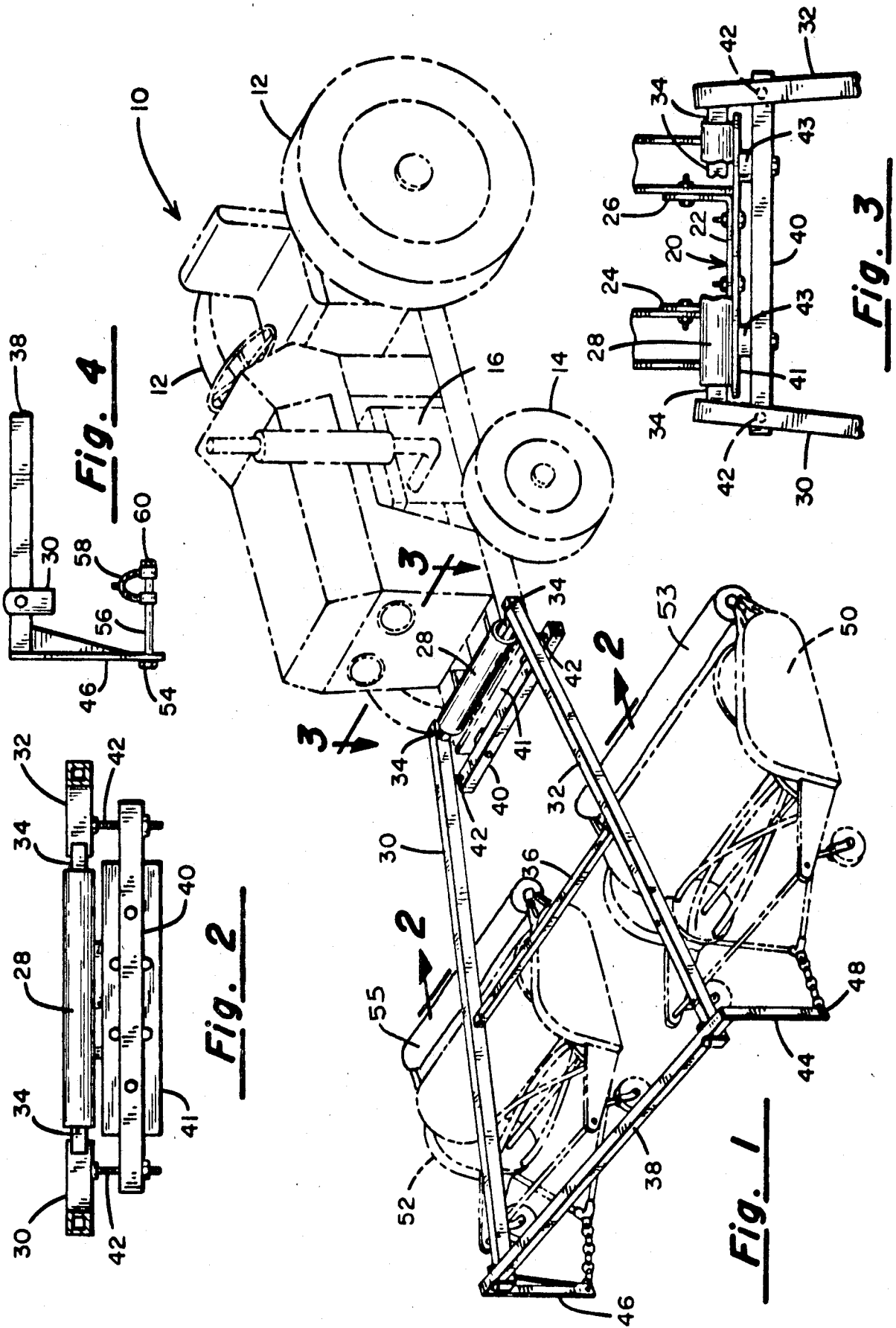

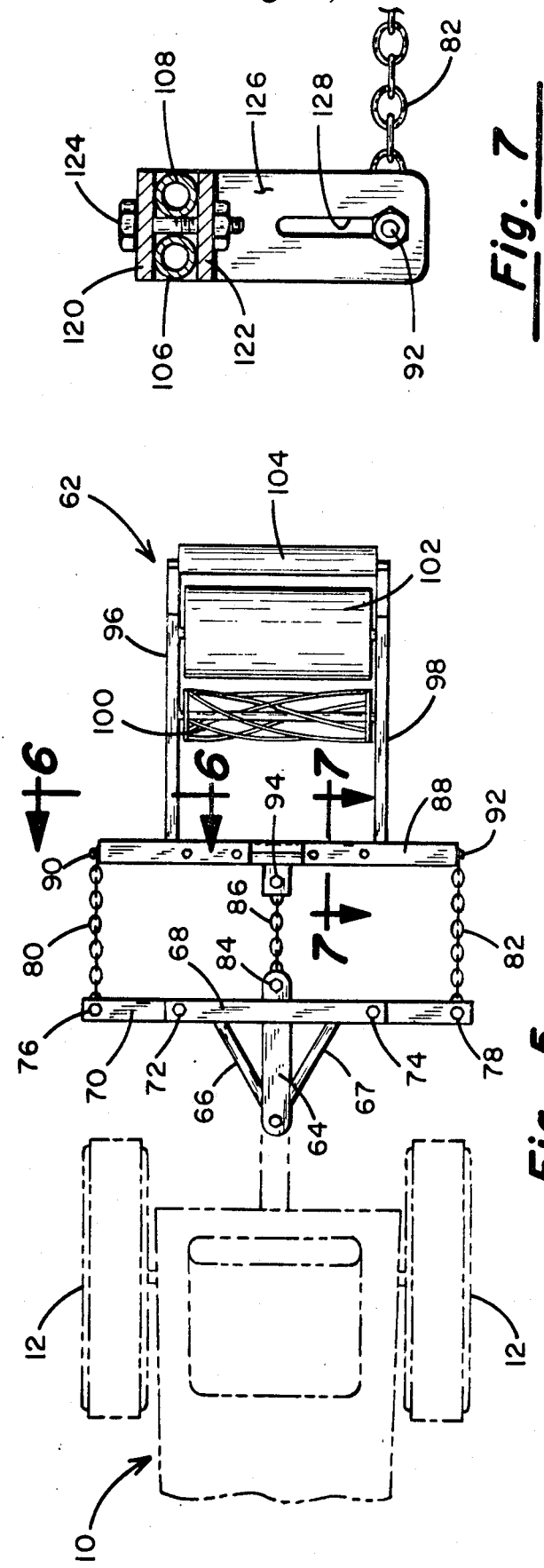
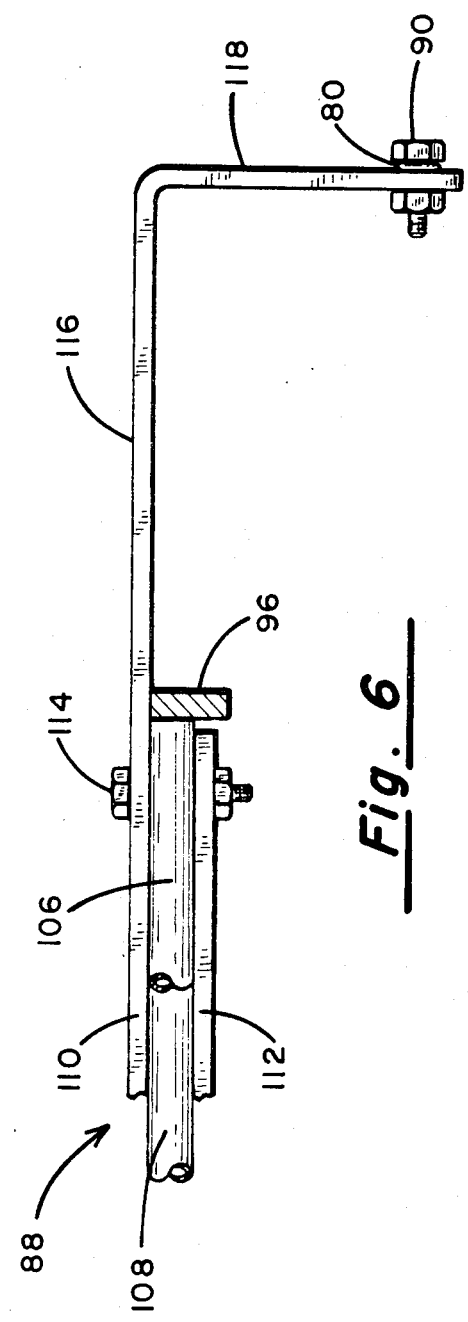
Fig. 5
Fig. 6
Fig. 7

MOWER ATTACHMENT FOR FARM TRACTORS

CROSS-REFERENCE TO RELATED APPLICATION

This is a continuation-in-part of application Ser. No. 619,078, filed June 11, 1984 now abandoned.

BACKGROUND OF THE INVENTION

I. Field of the Invention

This invention relates generally to apparatus for mowing grass, and more particularly to a forward attachment means adapted to connect to the front end of a tractor vehicle and which projects forwardly therefrom for a distance which permits reel-type mowers to be pulled from a location forward of the tractor's wheels, and a second attachment means for a reel-type mower trailing the tractor.

II. Discussion of the Prior Art

When cutting large expanses of grass, such as on a golf course, in a park or on large lawns, it is desirable to couple one or more mower heads to a motor-powered vehicle, such as a farm or garden tractor. It has been the conventional practice in the past to couple a trailer-like assembly from the rear of the tractor vehicle and thereby drag or pull the mower heads behind the vehicle. Where the grass to be cut is fairly long or wet, the weight of the tractor passing over the grass tends to compact it so that when the mower heads pass over the ground, the compacted grass is not cut off at the same level as the grass which has not been traversed by the wheels and, as a result, an unsightly appearing lawn or fairway may result. Also, when the vehicle is towing the mowers, the operator must watch over his shoulder to see that the outer mower head is overlapping the prior cut line and, therefore, cannot watch the path in front of the tractor for obstacles which might be damaged or which might damage the mower heads. In that the mowers are out in front of the vehicle, the operator has a clear view of the terrain to be traversed.

At the same time, support of reel-type mowers only ahead of the tractor tends to force a choice between a few large and unwieldly head assemblies, a complex linkage of a larger number of smaller mover head assemblies, or less than complete coverage across the mower width, requiring a second pass over a substantial portion of a previously cut track.

In accordance with one aspect of my invention, there is provided an attachment mechanism which is adapted to project forward of the front end of the tractor and from which one or more mower heads may be secured so that those mower heads are effectively pulled and perform their cutting operations at a location which is forward of the vehicle's wheels. Hence, the grass is clipped by the mower heads before the tractor's wheels reach the area to be cut. Because the grass has been cut off prior to passing under the wheels of the tractor vehicle, the grass blades are quickly restored to their upstanding position following the passage of the tractor wheels thereover.

Further, there is provided an attachment for at least one mower head which trails the tractor. The trailing mower head can be centrally located with respect to the tractor, to cut grass left uncut by the spaced-apart mower heads leading the tractor, thus to ensure a complete cut over at least the width of the tractor without adding mower heads ahead of the tractor.

SUMMARY OF THE INVENTION

In its simplest form, the present invention comprises a pair of spaced-apart steel arms of a predetermined length which are connected together at their forward end by a steel cross-member. Additional cross-braces may be joined between the two arms to provide desired rigidity and to maintain the two arms generally in a common plane. Cylindrical stubs are attached to the rearward ends of the two arms and extend inwardly toward one another. They are designed to telescopically fit within a cylindrical steel tube bolted or otherwise attached to the front of the tractor's frame. As such, the elongated arms are permitted to pivot about a generally horizontal axis, that axis being the centerline of the tubular member affixed to the front of the tractor. Adjustable leveling means are also provided proximate that attachment point for establishing the inclination of the arms relative to the ground.

Depending downwardly from the front ends of each of the arms is a rigid metal bar. The length of these bars is such that, taking into account the size of the tractor's wheels, the downwardly projecting arms will not be expected to engage the ground, irrespective of changes in terrain encountered during the mowing operations.

Suitably attached to the lower ends of the downwardly projecting bars by means of a short length of chain or a drawbar are reel-type mower heads such as of the type which are commercially available from the Rossman Mower Corporation of Glenview, Ill. Those skilled in the art desiring further information concerning the specifics of the construction of such mower heads may refer to U.S. Pat. Nos. 2,177,189, 2,126,139 and 2,150,876. When the mower heads are secured to the downwardly projecting bar members of the mower mounting bracket assembly of the present invention, they are effectively pulled, but from a location forward of the vehicle's wheels.

A third, centrally located mower head trails the mower, and has a widened draw bar attached by three chains to a similarly widened draw bar at the rearward end of the tractor. The trailing mower head spans generally the width between the tractor rear wheels, and cuts the grass not reached between the two forward mower heads.

OBJECTS

It is accordingly a principal object of the present invention to provide a means whereby grass mowing devices can be pulled by a vehicle with the cutting action taking place forward of the vehicle's wheels.

Another object of the invention is to provide a grass mower towing assembly which may be readily connected to the front end of a tractor-type vehicle and from which one or more reel-type mower heads can be pulled.

Another object of the invention is to provide a low cost attachment mechanism which can be used to tow one or more mower heads at a location forward of the front wheels of a motor-powered vehicle, with the attachment to the tractor being adjustable to accommodate different vehicles.

Yet another object of the invention is to provide a centrally located mower head trailing the motor powered vehicle, with an oversized draw bar arrangement for attaching the trailing mower head for maintaining its centered relation behind the vehicle.

These and other objects and advantages of the invention will become apparent to those skilled in the art from a reading of the following detailed description of the preferred embodiment, especially when considered in conjunction with the accompanying drawings in which like numerals in the several views refer to corresponding parts.

DESCRIPTION OF THE DRAWINGS

FIG. 1 is a perspective view of the present invention when appropriately coupled to a tractor;

FIG. 2 is a view taken along the lines 2—2 in FIG. 1;

FIG. 3 is a view taken along the lines 3—3 of FIG. 2;

FIG. 4 is a partial view of an alternate construction;

FIG. 5 is a top plan view of a trailing mower head assembly constructed in accordance with the present invention;

FIG. 6 is a sectional view taken along the line 6—6 of FIG. 5; and

FIG. 7 is a sectional view taken along the line 7—7 in FIG. 5.

DESCRIPTION OF THE PREFERRED EMBODIMENT

Certain terminology will be used in the following description for convenience and reference only and are not intended to in any way be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. This terminology will include the words above specifically mentioned, derivatives thereof and words of similar import.

Referring to FIG. 1, indicated generally by numeral 10 is a tractor-type vehicle with which the present invention finds use. Generally speaking, it includes two larger diameter rear wheels 12, two smaller diameter, steerable front wheels 14, the rear wheels adapted to be driven by an internal combustion engine 16 through a transmission, all as is well known in the art. Secured to the front portion of the tractor frame, i.e., to its bumper, is a generally U-shaped bracket 20 (FIG. 3), which is preferably formed from a steel plate and which has a base portion 22 and two parallel, spaced-apart legs 24 and 26. Welded to the bracket and extending across the legs 24 and 26 is a cylindrical piece of steel tubing 28 of a predetermined length, the purpose of which will become apparent as the description of the invention proceeds.

The mower head attaching means further comprises a first elongated arm member 30 and a second elongated arm member 32, each preferably being fabricated from steel tubing and having a rectangular cross-section. With reference to FIGS. 2 and 3, secured at the first end of each of the elongated arms 30 and 32 is a short cylindrical steel pivot stub as at 34 having an outside diameter which is less than the inside diameter of the tubular member 28. As such, the pivot stubs 34 can be made to telescopingly fit within the tubular member 28 allowing the arms 30 and 32 to pivot about the centerline of the tube 28 as an axis. The elongated arms 30 and 32 are joined to one another by means of a transversely extending brace 36, which is located intermediate the two ends of the arms. To provide structural rigidity, there is also connected to the outermost ends of the arms 30 and 32 a cross-member or draw bar 38. The relative lengths of the endmost cross-member 38 and the intermediate cross-member 36 are such that the arms 30 and 32 are at a predetermined angle with respect to one another and coverage so as to straddle the ends of the tubular member 28 with the stub portions 34 fitted therewithin.

Also attached to the vehicle's bumper and extending transversely beneath the elongated arms 30 and 32 is another piece of steel tubing 40 of a rectangular cross-section. More specifically, a steel plate 41 is bolted to the front end of the vehicle's frame to the base portion 22, and the steel tube 40 is then bolted to that plate 41 with spacers 43 interposed to bring the bar 40 further forward of the pivot stubs 34. Jack screws 42 project upwardly from the cross-member 40 so as to engage the underside of the elongated arms. Thus, by adjusting the height of the jackscrews 42, the angle of inclination of the arms 30 and 32 can be set.

Welded or dropwise affixed to the other ends of the elongated arms 30 and 32 are downwardly depending steel bars 44 and 46. With reference to FIG. 1, located at the lower ends of the flat steel bars 44 and 46 are attachment points which may, in their simplest form, merely comprise holes 48 formed through the thickness dimension of the bars. A hook may then be inserted through these holes and a short length of chain used to couple the hook to the mower head assemblies 50 and 52. As mentioned above, the leading mower head assemblies are commercially available items. They each include a frame structure in which helical mower blades are journaled for rotation and rollers and wheels are used to maintain an appropriate altitude for these blades relative to the ground as the mower heads are drawn thereacross. Proper altitude is further assured by weighted cylinders 51 and 53 mounted to head assemblies 50 and 52, respectively. Each cylinder tends to overcome the tendency in its associated head assembly to be jostled as it travels over rough ground.

Referring to the perspective view of FIG. 1, it will be noted that the mower heads 50 and 52, when secured to the downwardly depending bars 44 and 46 are positioned forward of the front wheels of the tractor vehicle. As such, as the vehicle moves forward, the grass is cut before the tractor wheels pass over it. The elevation of the bars 44 and 46 above the ground is adjustable through the jackscrews 42.

Using the mower head attachment mechanism of the present invention also permits tight cornering of the tractor without interference between the tractor wheels and the mower heads. Specifically, it has been found possible to turn a complete circle having a fifteen foot diameter without such interference. This is achieved by proper attention to the overall length of the elongated arms 30 and 32.

While in most instances a hook and chain arrangement for coupling the downwardly depending arms 44–46 of the mower heads is altogether satisfactory, in some instances it may prove desirable to be able to laterally shift, within limits, the location of the tie point to the mower head assemblies. Referring to FIG. 4, there is shown one way of accomplishing this end. Passing through a hole 48 formed in the lower end of the downwardly depending arm 46 is an elongated bolt 54 having a tubular sleeve spacer 56 mounted thereon. The bolt 54 also passes through aligned apertures formed in the opposed legs of a clevis 58 and a nut 60 is threaded onto the bolt 54 to hold the parts in place. By selecting the length of the bolt and the length of the spacer 56, the connection point between the mower head and the clevis can be shifted laterally to achieve a desired alignment of the mower heads relative to the vehicle's front wheels.

It is also envisioned that the front cross-member 38 can be extended laterally in both directions so that an increased number of downwardly depending coupling bars like 44 and 46 and additional mower heads may be coupled thereto so that a wider swath may be cut as the tractor moves across the terrain. Because the cutting mowers are located in front of the vehicle, the operator can always observe the approaching terrain and avoid obstacles like watering hoses that could be damaged by the mower or rocks and stumps which would damage the mower heads.

Where the mower heads are spaced so as to be pulled in a path ahead of the tractor wheels, a gap may exist between the cutting blades of the plural mowers. By properly positioning one or more further towed mower heads at the rear of the tractor in the space missed by the front mowers but between the path traversed by the tractor's wheels, a full swath of any practical width is cut on one pass of the tractor. It has also proved expedient to locate a heavy spring with the high spring constant between the rear mower head and the tow bar to which it is attached to the tractor. This spring causes the rear mounted mower head to better track the uncut grass passing between the front mounted mower heads, especially when cornering.

FIGS. 5-7 illustrate an attachment means for towing a trailing mower head assembly 62 behind tractor 10, and in centered relation with the tractor in order to mow the grass left uncut in the gap between the forward head assemblies 50 and 52. Linkage for attaching mower assembly 62 to the tractor includes a central tongue 64 attached to the tractor, and two angled side members 66 and 67, all of which are attached to a transverse bar 68.

One aspect of the present invention is an elongate draw bar 70 which is secured to transverse bar 68 by bolts 72 and 74, and effectively increases the draw bar width to approximately the distance between the outside edges of wheels 12 of the tractor. Outside bolts 76 and 78 are provided for the mounting of first and second chains 80 and 82, respectively, to draw bar 70. A central bolt 84 is provided at the trailing end of central tongue 64 for the attachment of a third chain 86. Chains 80, 82 and 86 link draw bar 70 to a mower head assembly draw bar 88, substantially equal in length to draw bar 70. Bolts at 90, 92 and 94 secure chains 80, 82 and 86, respectively, to draw bar 88.

Fixed to draw bar 88 are first and second rearwardly extending arms 96 and 98, which support for rotation a trailing reel mower head 100 and a drum 102. A weighted cylinder 104 is secured to arms 96 and 98 to reduce the tendency of drum 102 to bounce as it traverses rough terrain, and thus provide more even cutting and improved operator control.

A portion of the right side of mower assembly draw bar 88 is illustrated in FIG. 6 to reveal a transversely directed first tubular member 106 attached to first arm 96 by welding or the like. The tubular member is similarly attached to second arm 98. A portion of tubular member 106 is cut away to reveal a second transverse tubular member 108 positioned forwardly of tubular member 106 and similarly attached to arms 96 and 98. First upper and lower flat stabilizing bars 110 and 112 are secured to tubular members 106 and 108 on opposite sides thereof by a bolt 114.

First upper bar 110 includes a horizontal extension 116 which provides the enhanced transverse length of draw bar 88, and a vertically downward extension 118 which permits the selective vertical positioning of bolt 90, and also of the forward end of chain 80.

FIG. 7 reveals similar structure on the opposite side of draw bar 88. A second upper bar 120, and a second lower bar 122, are fastened against the top and bottom edges of tubular members 106 and 108 by a bolt 124. Second upper bar 120 extends transversely outward from arm 98 in the same manner as upper bar 110 extends beyond arm 96. Bar 120 also includes a vertically downward extension 126 substantially identical to downward extension 118. Formed in extension 126 is a vertical slot 128, which permits vertical adjustment of bolt 92 and thus the rearward end of chain 82, if desired. A similar slot is provided in extension 118, although not shown.

Mower head assembly 62, used in conjunction with forward head assemblies 50 and 52, provide an arrangement in which tractor 10 is highly maneuverable, yet cuts a width swath. Location of head assembly 62 to trail the tractor rather than lead it tends to balance the arrangement for enhanced driver control. The enhanced width of draw bars 70 and 88 ensures that head assembly 62 accurately follows tractor 10 to remain substantially centered, even around curves. This avoids the need for the high spring constant springs mentioned above. Further, upper and lower bars 110 and 112, and their counterpart bars 120 and 122 on the opposite side, strengthen and stabilize the linkage between the tractor and trailing mower head assembly, particularly at draw bar 88. The weighted cylinders added to the forward and trailing mower assemblies ensure a more even cut by resisting the jouncing tendency of the assemblies as they travel over uneven ground.

The invention has been described herein in considerable detail, in order to comply with the Patent Statutes and to provide those skilled in the art with the information needed to apply the novel principles and to construct and use such specialized components as are required. However, it is to be understood that the invention can be carried out by specifically different equipment and devices and that various modifications, both as to equipment details and operating procedures can be effected without departing from the scope of the invention itself.

What is claimed is:

1. An apparatus for mowing grass including:

a motor powered vehicle having an elongate, longitudinally directed frame, a pair of drive wheels mounted with respect to a rearward end portion of the frame, and a pair of steerable wheels mounted with respect to a forward end portion of the frame;

a forward mounting means for mounting at least two mowing head assemblies forwardly of said frame, said forward mounting means including first and second opposed, elongate and substantially rigid arms, each arm having a transverse, inwardly directed cylindrical stub at its rearward end; a transversely directed cylinder fixed with respect to the forward end portion of said frame and substantially centered relative to the vehicle, said cylinder open at first and second opposed ends to telescopingly receive said cylindrical stubs of the first and second arms at said first and second ends, respectively, thereby to independently mount said first and second arms pivotally with respect to said frame; an elongate, transversely directed forward draw bar, longer than said cylinder and connected at its opposite ends to the forward ends of said first and second arms, thereby to traverse an arcuate path as said first and second arms pivot relative to said frame; first and second stop means for limiting the downward pivoting of said first and second arms, respectively; and a plurality of downwardly extending legs affixed to said draw bar at spaced locations along said draw bar;

a plurality of leading mowing assemblies forwardly of said frame, each coupled with respect to the lower end of one of said legs, for movement independent of the remaining mowing assemblies as said forward draw bar and legs are moved forwardly by the driving of said vehicle, the arcuate movement of said draw bar accommodating irregularities in the terrain, and wherein said stop means are adjustable to selectively position said legs above the terrain;

said assembly further including an elongate, transversely directed first trailing draw bar assembly mounted with respect to the rearward end portion of said frame, and having a length at least substantially equal to the distance between said rear wheels;

a second trailing draw bar assembly including a pair of transversely extended tubular members substantially centered with respect to said vehicle, first upper and lower bars mounted on opposite sides of the tubular members with said first upper bar extended transversely beyond one end of said tubular members, and second upper and lower members mounted on opposite sides of said tubular members with said second upper bar extended beyond the opposite end of said tubular members;

a plurality of linkage members connecting said first and second trailing draw bar assemblies; and a trailing mowing assembly fixed with respect to said second trailing draw bar and substantially centered with respect to said frame.

2. The apparatus of claim 1 wherein:
each of said legs includes a horizontal member coupled to the lower end of the leg, and a clevis laterally adjustably spaced along the horizontal member and coupled to one of said mowing assemblies by a length of chain.

3. The apparatus of claim 2 wherein:
each of said first and second stop means includes an elongate bar transversely and fixed attached with respect to the forward end portion of said frame and in underlying relation to its associated one of said first and second arms, and a jack screw means associated with each elongate bar operatively disposed between its associated elongate bar and its associated arm, for adjustably supporting its associated arm at a predetermined angle relative to said frame.

4. The apparatus of claim 1 including:
a weighted cylinder attached to each of said mowing assemblies.

5. The apparatus of claim 1 wherein:
each of said first and second upper bars of said second trailing draw bar assembly includes, at its outward end portion, a vertically downwardly extended portion for attachment of one of said linkage members connecting said first and second trailing draw bars.

6. The apparatus of claim 5 including:
means forming a vertical slot in each of said vertically downwardly extended portions, to permit vertical adjustment of the location at which the associated one of said linkage members is attached to said second trailing draw bar.

* * * * *